United States Patent [19]

Pinkus et al.

[11] 4,440,402
[45] Apr. 3, 1984

[54] FERROFIN MAGNETIC SEAL WITH OPPOSED FIN-LIKE PROJECTIONS

[75] Inventors: Oscar Pinkus, Guilderland; Jed A. Walowit, Clifton Park, both of N.Y.

[73] Assignee: Mechanical Technology Incorporated, Latham, N.Y.

[21] Appl. No.: 361,787

[22] Filed: Mar. 25, 1982

[51] Int. Cl.³ .................. F16J 15/16; F16J 15/44; F16J 15/40
[52] U.S. Cl. ..................... 277/80; 277/55; 277/135
[58] Field of Search .............. 277/13, 14 R, 14 V, 277/25, 80, 135, 53, 55, 56

[56] References Cited

U.S. PATENT DOCUMENTS

| | | | |
|---|---|---|---|
| 1,642,085 | 9/1927 | Pochobradsky | 277/55 |
| 2,557,140 | 6/1951 | Razdowitz | 277/80 |
| 3,097,853 | 7/1963 | McHugh | 277/80 X |
| 3,940,150 | 2/1976 | Martin et al. | 277/80 X |
| 4,304,411 | 12/1981 | Wilcock et al. | 277/80 |
| 4,335,885 | 6/1982 | Heshmat | 277/80 X |

FOREIGN PATENT DOCUMENTS

| | | | |
|---|---|---|---|
| 783881 | 10/1957 | United Kingdom | 277/80 |
| 1224234 | 3/1971 | United Kingdom | 277/55 |
| 653470 | 3/1979 | U.S.S.R. | 277/80 |
| 875152 | 10/1981 | U.S.S.R. | 277/80 |

Primary Examiner—Robert S. Ward
Attorney, Agent, or Firm—Joseph V. Claeys; Arthur N. Trausch, III

[57] ABSTRACT

A ferrofin magnetic-fluid seal for hermetically sealing the space between a portion of a rotating member of magnetically permeable material and a portion of a close-fitting, spaced-apart stationary member also fabricated from magnetically permeable material and comprising a part of a housing for journalling the rotating member. The ferrofin magnetic-fluid seal is comprised of a plurality of concentric, fin-like projections of magnetically permeable material formed on each of the rotating member and the stationary member in spaced-apart opposing relation to define a plurality of magnetic gap regions. The magnetic ferrofluid is disposed within the magnetic gap regions. A magnetic field producing means is magnetically coupled in closed magnetic circuit relationship with at least the portions of the rotating and stationary members, the opposed fin-like projections and the magnetic ferrofluid trapped in the magnetic gaps defined between the opposing ends of the fin-like projections. The new and improved ferrofin magnetic-fluid seal can be used either alone or in conjunction with a centrifugal seal to form a combination magnetic/centrifugal fluid-seal.

19 Claims, 8 Drawing Figures

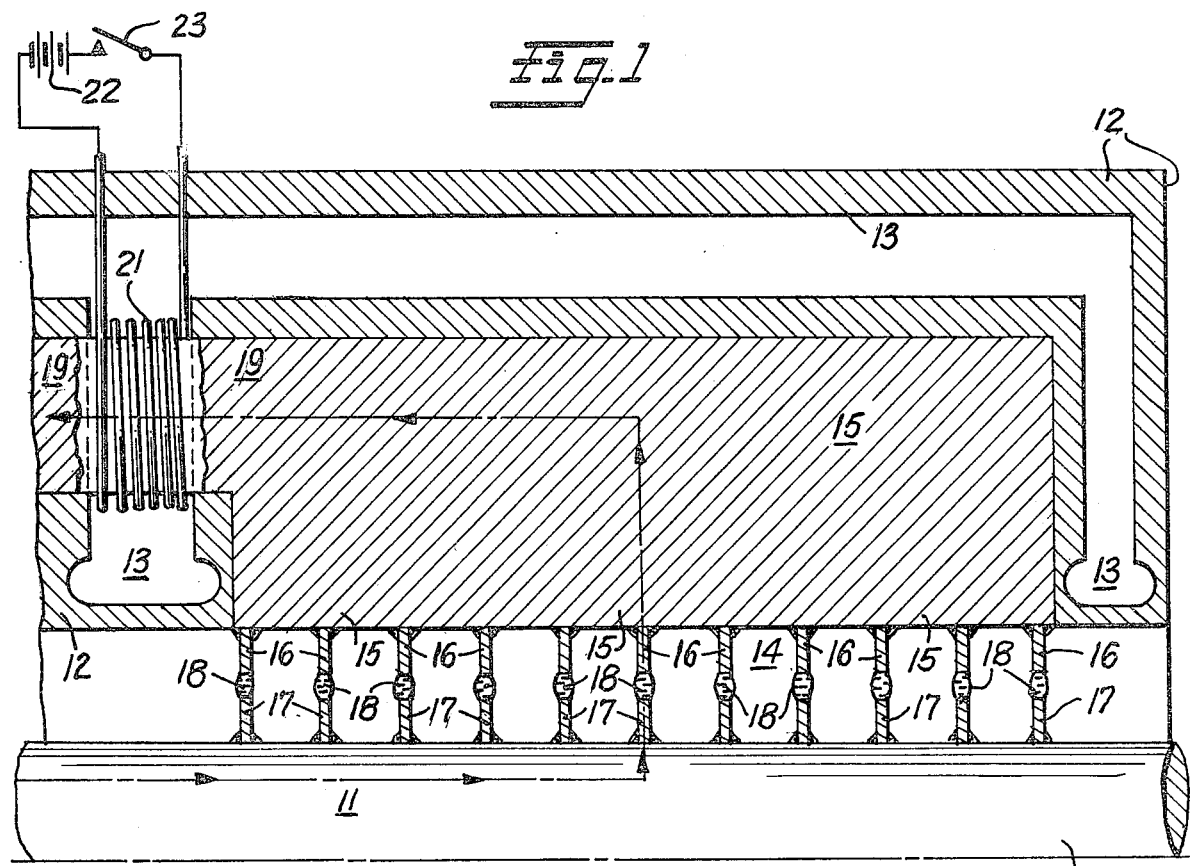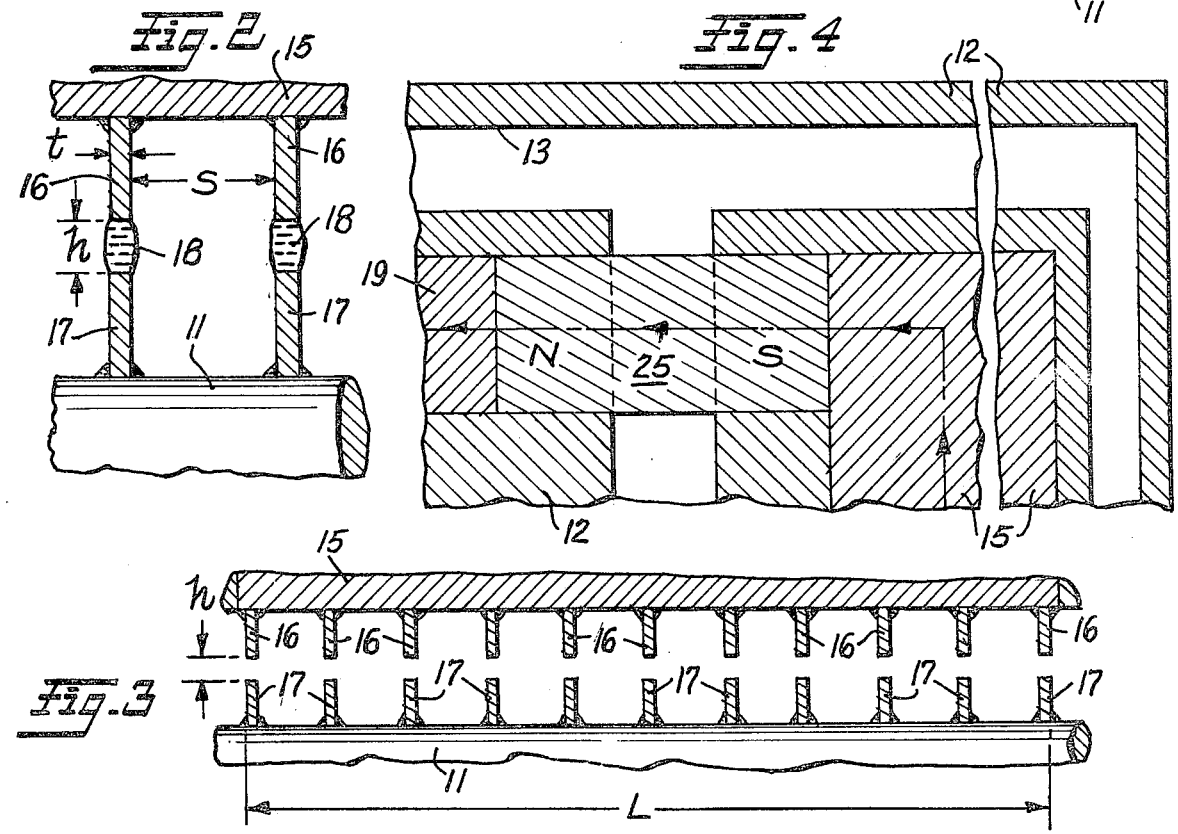

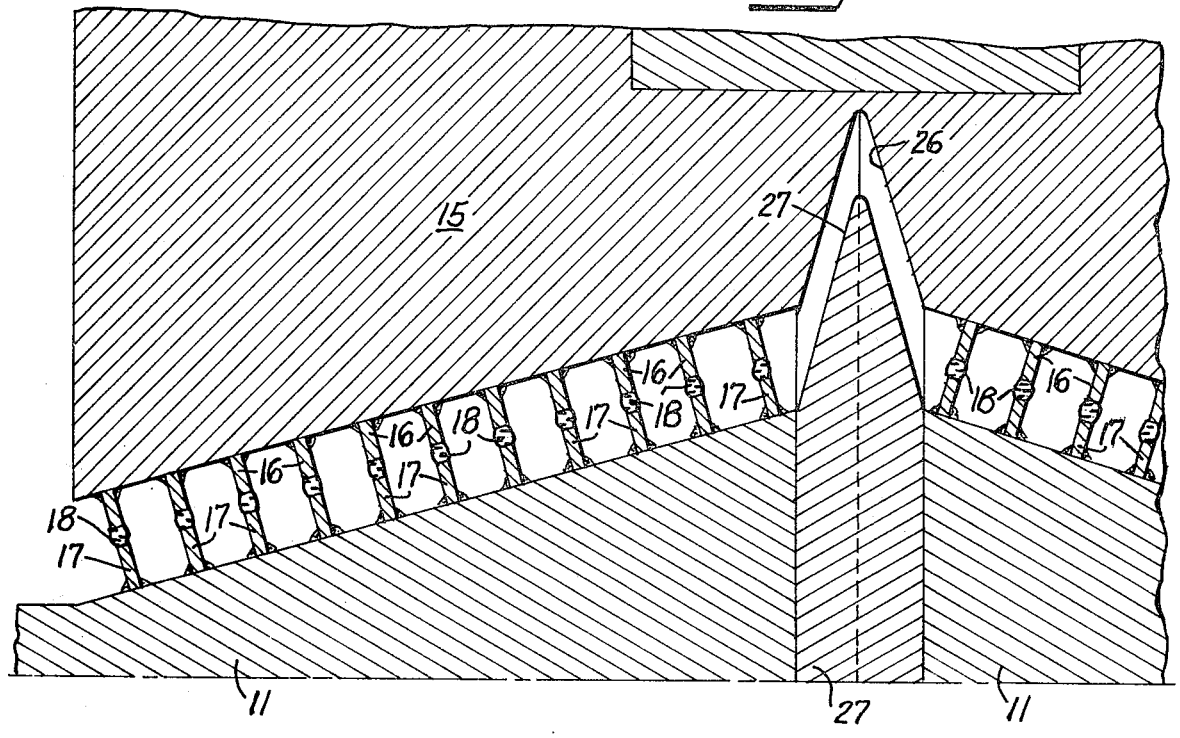
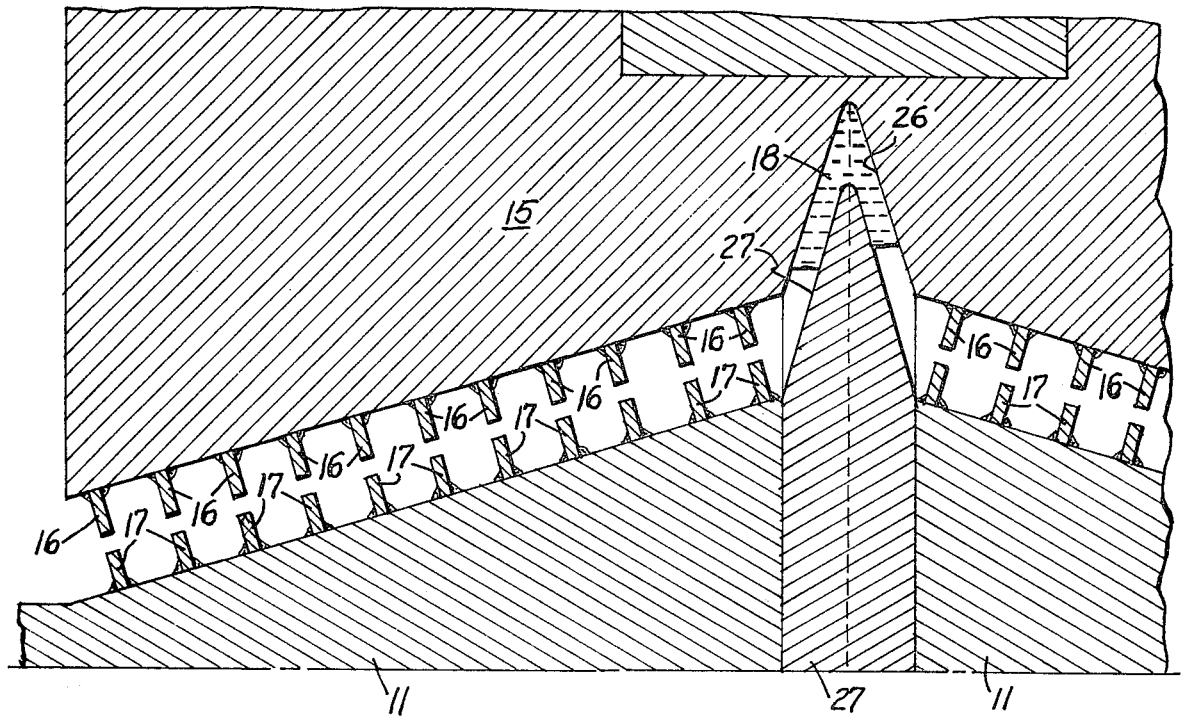

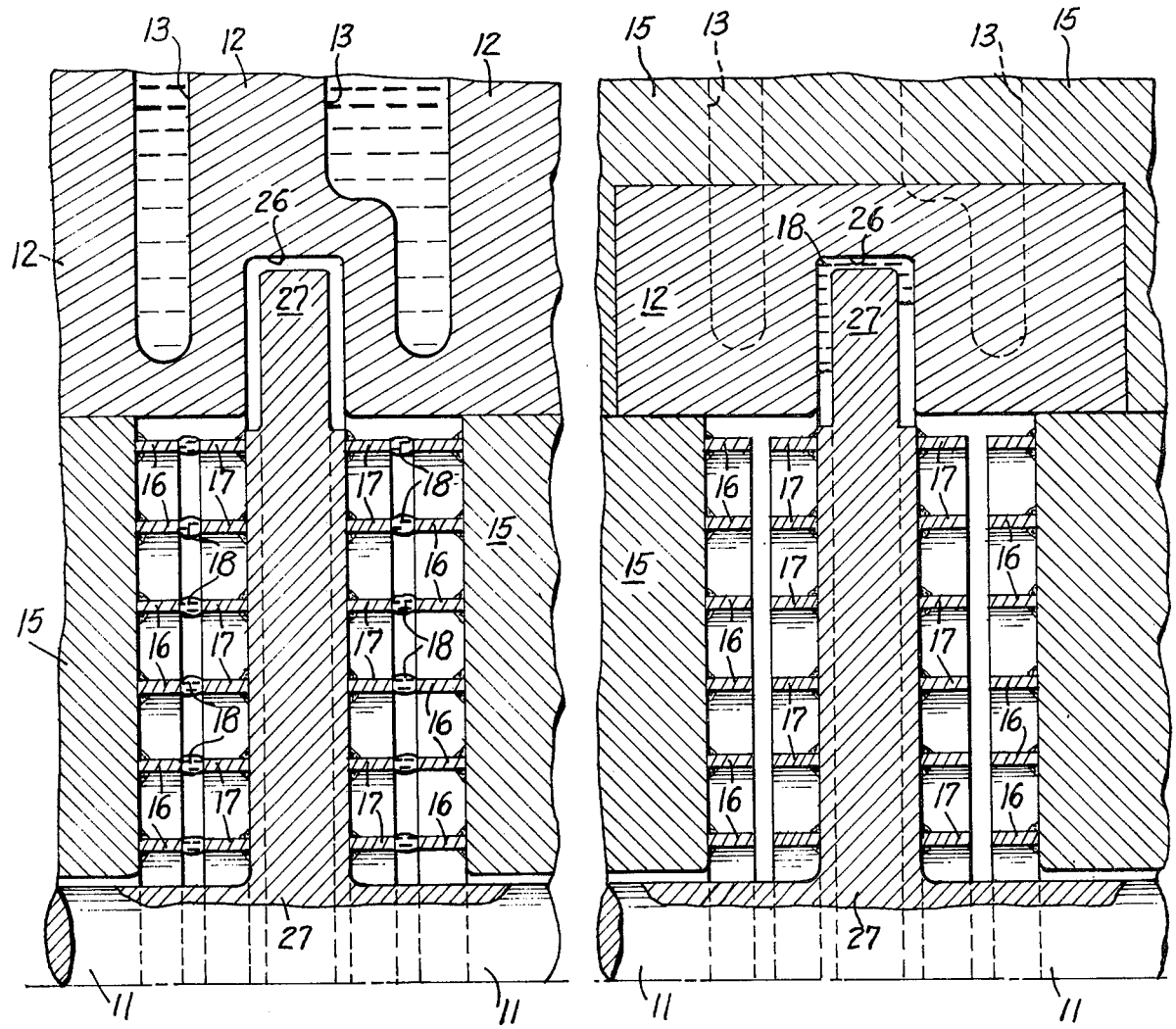

FERROFIN MAGNETIC SEAL WITH OPPOSED FIN-LIKE PROJECTIONS

TECHNICAL FIELD

This invention relates to new and improved magnetic seals. More particularly, the invention relates to an improved ferrofin magnetic seal design wherein the geometry of the magnetic seal is optimized to provide maximum sealing capability in a given size magnetic seal structure.

BACKGROUND PRIOR ART

U.S. Pat. No. 3,620,584, issued Nov. 16, 1971 for "Magnetic Fluid Seals", describes a modular magnetic-fluid seal wherein a magnetic fluid is captured in a gap between a rotating shaft and a stationary housing in which the shaft is journalled. The magnetic fluid thus captured, is designed to provide a leak-proof hermetic seal between the rotating shaft and the housing.

There are a number of advantages provided by a magnetic seal structure, namely, there is no leakage of the sealed substance across the magnetic-fluid seal, there is no rubbing or wear at the mating surfaces where the seal is formed, and structurally a magnetic seal is a very simple device. However, there are still a number of unanswered problems involved in the design and use of magnetic seals, the most significant of which is the capacity of a given magnetic seal construction to withstand differential pressure $\Delta p$ across the seal. To resolve this problem, the present invention was devised.

SUMMARY OF THE INVENTION

It is therefore a primary object of the invention to provide a new and improved ferrofin magnetic seal design wherein the seal geometry is optimized to provide maximum sealing capacity for a given physical size magnetic seal structure.

In practicing the invention a ferrofin magnetic-fluid seal is provided for hermetically sealing the space between a portion of a rotating member of magnetically permeable material and a portion of a close fitting spaced-apart stationary member of magnetically permeable material. The ferrofin magnetic-fluid seal comprises a plurality of concentric fin-like projections of magnetically permeable material formed on each of the rotating members and the stationary member portions in spaced-apart opposing relation to define a plurality of magnetic gap regions. A magnetic fluid is disposed within the magnetic gap regions. A magnetic field producing means is magnetically coupled in closed magnetic circuit relationship with at least the said portions of the rotating and stationary members and further includes the opposed fin-like projections and the magnetic fluid trapped in the magnetic gaps defined between the opposing ends of the fin-like projections.

Another feature of the invention is the provision of a ferrofin magnetic fluid seal having the above-set forth characteristics wherein the fin-like projections each have a tooth width t and a tooth spacing s which are optimized so as to yield a maximum number of magnetic seal stages N over a given axial length L of the magnetic seal region in accordance with the expression $N_{max}=L/(t+s)$. In preferred embodiments of the invention, the ends of the opposing fin-like projections are spaced-apart a distance h that defines the magnetic gaps in which the magnetic fluid is trapped to form the magnetic seal and optimum sealing capacity is obtained where t ranges in value from substantially h to 5h and s ranges in value from substantially 2h to 3h. In practical embodiments of the invention the gap spacing h is of the order of 10 millinches so that t ranges from 10–50 millinches and s ranges from 20–30 millinches. The resultant ferrofin magnetic seal structure is somewhat comb-like in nature upon being thus dimensioned.

Still another feature of the invention is to provide a ferrofin magnetic seal having the above characteristics wherein maximum sealing capability is achieved when the design is such that the dimension t is substantially equal to 2h and the dimension s is substantially equal to the dimension 3h where h is the gap spacing between the opposing ferrofin teeth on the ferrofin magnetic seal structure.

Still another feature of the invention is the provision of a combination magnetic/centrifugal-fluid seal wherein the magnetic sealing region is constructed as described in the preceeding paragraphs and further includes a circumferentially arranged centrifugal seal region radially disposed outwardly from the magnetic seal region and communicating therewith and physically located between the rotating and stationary members for receiving and pooling fluid centrifugally thrown here during high speed rotation of the rotating member to thereby form a centrifugal-hermetic seal between the stationary member and the rotating member during high speed rotation of the rotating member.

A still further feature of the invention is the provision of a ferrofin magnetic fluid seal having the above-set forth characteristics wherein the source of magnetic flux in certain embodiments of the seal is provided by an electromagnet and in other working embodiments the source of magnetic flux may be provided by a permanent magnet.

BRIEF DESCRIPTION OF DRAWINGS

These and other objects, features and many of the attendant advantages of the invention will become better understood upon a reading of the following detailed description when considered in conjunction with the accompanying drawings wherein like parts in each of the several figures are identified by the same reference character, and wherein:

FIG. 1 is a partial, longitudinal sectional view of a new and improved ferrofin magnetic seal constructed according to the invention;

FIG. 2 is a partial fragmentary view of a portion of the ferrofin magnetic seal and illustrates details of the relative geometry and spacing of the fin-like projections formed on the shaft and housing in which the shaft is journalled and comprising a part of the ferrofin magnetic seal construction;

FIG. 3 is a partial, fragmentary view of the ferrofin magnetic seal illustrating the length-wise dimension and lay-out geometry of the ferrofin construction;

FIG. 4 is a partial, fragmentary view of an alternative embodiment of the ferrofin magnetic seal structure shown in FIG. 1 wherein a permanent magnet is employed in place of the electromagnetic used in the FIG. 1 embodiment of the invention;

FIG. 5 is a partial longitudinal sectional view of a combination magnetic/centrifugal-fluid seal constructed according to the invention wherein the magnetic seal region of the combined magnetic/centrifugal seal structure employs a ferrofin magnetic seal construction according to the invention and wherein FIG.

5 illustrates the combined magnetic/centrifugal seal while operating in the magnetic sealing mode;

FIG. 6 is a similar longitudinal sectional view of a combination magnetic/centrifugal seal identical to that shown in FIG. 5, but illustrates the seal in the centrifugal sealing mode;

FIG. 7 is a longitudinal sectional view of still a different embodiment of a combined magnetic/centrifugal seal according to the invention wherein rotatable vane is employed in conjunction with the ferrofin magnetic seal structure and wherein FIG. 7 illustrates the combined magnetic/centrifugal seal in the magnetic sealing mode; and FIG. 8 is a partial longitudinal sectional view similar to FIG. 7 but illustrates the combined magnetic/centrifugal seal in a centrifugal sealing mode.

BEST MODE OF PRACTICING INVENTION

FIG. 1 is a partial, longitudinal sectional view of a new and improved ferrofin magnetic seal according to the invention. In FIG. 1 a rotating shaft is shown at 11 which is journalled by bearings (not shown) in a housing indicated generally at 12. The housing 12 may have cooling passageways shown at 13 formed therein for supply of a coolant fluid for cooling the area surrounding a ferrofin magnetic seal region indicated generally at 14. The ferrofin magnetic sealing region 14 is disposed between the rotatable shaft 11 and a portion of the housing 12 indicated at 15 which is a section of housing 12 that forms the magnetic seal and is comprised of a magnetic permeable material such as stainless steel or other magnetically permeable alloys of iron. The magnetic seal forming housing section 15 has a plurality of axially arrayed fin-like projections indicated at 16 which are concentrically arrayed around its inner periphery so as to surround the shaft 11. The concentric fin-like projections 16 are secured to the inner periphery of magnetically permeable housing section 15 by welding or other suitable means and are arrayed in opposing relationship to a corresponding set of concentric fin-like projections 17 axially secured around the shaft 11 which likewise is magnetically permeable. The fin-like projections 16 and 17 are fabricated from stainless steel or other magnetically permeable material and a ferromagnetic fluid, also referred to as a ferrofluid, shown at 18 is disposed between the gaps defined by the opposing opposite ends of the fin-like projections 16 and 17. The magnetically permeable housing section 15 which helps to define the ferrofin magnetic seal has a portion 19 which is surrounded by an electromagnetic coil 21 that is excited from a source of electric current 22 through an on-off control switch 23. The electromagnetic coil 21 forms a source of magnetic flux which threads through an extended part of the housing section portion 19 to the left of FIG. 1 (not shown) and spaced from the rotating shaft 11 to form a closed magnetic circuit through the shaft 11, the fin-like projections 17, the ferrofluid 18 in the gaps between fin-like projections 16 and 17, the fin-like projections 16, magentically permeable housing section 15 back through the magnetically permeable section 19 that is excited by electromagnetic coil 21. As known in the art, with the switch 23 closed, an electromagnetic field will be produced through the center of the coil 21 that induces the flow of magnetic flux through the closed magnetic circuit described above, thereby trapping droplets of the ferrofluid 18 between the opposed ends of the fin-like projections 16 and 17. In this manner, a hermetic ferrofin magnetic seal is formed.

FIG. 2 is a partial fragmentary view of a portion of the ferrofin magnetic seal structure shown in FIG. 1 and illustrates details of the relative geometry and spacing of the fin-like projections formed on shaft 11 and housing section 15. As best seen in FIG. 2, each of the fin-like projections 16 and/or 17 has a tooth width t and tooth spacing between adjacent fin-like projection s which are optimized so as to yield a maximum number of magnetic seal stages N over a given axial length L of the shaft as shown in FIG. 3 in accordance with the expression $$N_{max} = L/(t+s).$$

The opposing spaced-apart ends of the sets of fin-like projections 16 and 17 are spaced-apart by a gap distance h which in effect determines the size of the droplet of ferrofluid 18 that must be trapped within the space defined by this gap. In a seal such as illustrated in FIGS. 1 and 3 and which consists of a number of stages or tooth elements, there are basically two geometric variables which can be considered, namely the minimal width of each stage t and the spacing between the stages s. In this regard, it should be kept in mind that the whole question of optimization rests on the postulate that the total extent of any given seal is fixed, and an optimum design is required for a given alloted axial space L. Within this constraint there are two opposing effects; the larger the number of stages, the higher the differential pressure capacity ($\Delta p$) for the seal and it would thus be desireable to use as many as possible in the distance L provided by the stages. On the other hand, too close a proximity of the teeth or ferrofin fin-like projections can result in producing interference in each others magnetic field and prevents the attainment of the maximum possible $\Delta p$ per stage. Within these opposing requirements, for a given ratio (t/h) there is an optimum corresponding ratio (s/h) which will yield the maximum total differential pressure that the multiple stage seal can withstand. The optimum values of the ratios (t/h and s/h) to yield a maximum differential pressure $\Delta p$ per stage, is set forth in the below listing:

| $\frac{t}{h}$ | $\frac{s}{h}$ |
|---|---|
| 1.00 | 1.957 |
| 1.50 | 2.175 |
| 2.00 | 2.363 |
| 2.50 | 2.529 |
| 3.00 | 2.679 |
| 3.50 | 2.818 |
| 4.00 | 2.948 |
| 4.50 | 3.070 |
| 5.00 | 3.185 |

From the values set forth in the above listing, it will be appreciated that optimum values of $\Delta p$ per stage, and hence maximum $\Delta p$ for a given design multiple stage ferrofin magnetic seal according to the invention, are obtained in designs wherein the ends of the opposing fin-like projections are spaced apart a distance h that defines the gaps in which the magnetic fluid is trapped to form the magnetic seal and wherein the value of t ranges in value from substantially h to 5h and the value s ranges in value from substantially 2h to 3h. In a preferred practical embodiment of a ferrofin magnetic seal according to the invention, the ends of the opposing fin-like projections are spaced apart a distance h that defines the gaps in which the magnetic ferrofluid is trapped to form the magnetic seal and wherein maximum sealing capacity is obtained by a design with t substantially equal to 2h and s substantially equal to 3h. In such a design the number of magnetic seal stages N preferably is at least 4.

As an example of the above-described preferred, magnetic seal according to the invention providing maximum sealing capacity, a practical distance for the spacing h is 10 milli-inches in a design where the lenght L for accommodating the multiple stage seal is of the order of 200 milli-inches. According to the above formula, $$\text{the } N_{max} = \frac{L}{(t+s)} = \frac{200}{2h+3h} = \frac{200}{(20+30)} = \frac{200}{50} = 4.$$

The resultant structure is somewhat comblike in nature and while it might be feared that tooth widths of only 20–30 mils would be structurally undesireable and spacing of somewhat the same order would raise the risk of flooding the interstage spaces, still the use of such fine comb-like sealing stages has been determined to offer optimum sealing conditions.

FIG. 4 of the drawings is a partial, fragmentary view of an alternative embodiment of a ferrofin magnetic seal structure according to the invention wherein a permanent magnet 25 is employed in place of the electromagnet 21 used in the FIG. 1 embodiment of the invention. In most applications of ferrofin magnetic seals according to this invention, it is preferable to employ an electromagnet instead of a permanent magnet since the sealing capacity goes up with the strength of the applied magnetic field and it is easier to adjust the strength of the applied magnetic field while employing an electromagnet after a particular design seal has been fabricated. Besides allowing variations in field strength intensity, the use of an electromagnet also permits degaussing of the overall system. This latter feature may be required in order to facilitate fluid movement of the ferromagnetic fluid 18 employed with the seal. Finally, for a particular magnetic circuit, it is desirable to find the optimum magnetic field intensity, as above a certain point the pole pieces (ferro fin-like projections) becomes saturated causing thereafter an actual drop in field intensity across the magnetic fluid and consequently a drop in $\Delta p$ capacity. For all of these reasons, use of an electromagnet rather than a permanent magnet is preferred. However, for some applications, the use of a permanent magnet may be dictated because of the unavailability of a source of electric power, etc., for the particular application, in which case the permanent magnet embodiment illustrated in FIG. 4 could be employed.

FIGS. 5 and 6 of the drawings illustrate a combination magnetic/centrifugal fluid seal having a magnetic sealing region defined by a plurality of axially arrayed, concentric ferro fin-like projections 16 which are arrayed oppositely from corresponding fin-like projections 17 extending from a tapered portion of the shaft 11 so that the ends oppose the ends of the fin-like projections 16 to define the gaps in which a ferrofluid 18 can be trapped in the manner described earlier with relation to FIG. 1 of the drawings. The ferro fin-like projections 16 extend from a magnetically permeable portion 15 of a housing in which the shaft 11 is journalled (not shown). In construction and operation, the magnetic sealing region thus comprised is entirely similar to that described earlier with relation to FIGS. 1, 2 and 3 of the drawings. The magnetic sealing region thus comprised however, comprises a part of a combination magnetic/centrifugal-fluid seal in that the gaps between opposing ends of the fin-like projections 16 and 17 communicate with a centrifugal seal region indicated generally at 26 and which is physically located between the housing section 15 and shaft 11 and radially disposed outwardly from shaft 11 so as to receive and pool the ferrofluid 18 that is thrown there through centrifugal action during high speed rotation of shaft 11 in the manner shown in FIG. 6 of the drawings. For this purpose, it is preferred that an electromagnet be employed with the combined seal so that during high speed rotation while the combination magnetic/centrifugal fluid seal is in the centrifugal sealing mode shown in FIG. 6, the electromagnet is de-energized to facilitate migration of the magnetically susceptible ferrofluid 18 from the magnetic sealing region into the centrifugal sealing region. For a more detailed description of the design considerations employed in fabricating the combination magnetic/centrifugal fluid seals as illustrated in FIGS. 5 and 6, reference is made to co-pending U.S. Pat. No. 4,304,411 for a magnetic/centrifugal-fluid seal, issued Dec. 8, 1981 in the name of Donald F. Wilcock and Martin W. Eusepi and assigned to Mechanical Technology, Incorporated, the assignee of the present invention.

For suitable ferrofluids for use as the ferrofluid 18 described in this application, cooling features and other practical design considerations that would be employed in the fabrication of a practical ferro fin magnetic seal used alone or in conjunction with a centrifugal seal as shown in FIGS. 5 and 6, the disclosure of the above-noted U.S. Pat. No. 4,304,411 hereby is incorporated by reference in its entirety into the disclosure of this application. Briefly, however, it can be stated that at standstill and slow rotating speeds below say about 10,000 rpm, the magnetic sealing region provides an hermetic seal between spaces on opposite ends of the shaft 11 between shaft 11 and housing section 15. At higher rotational speed above say 10,000 rpm to perhaps 25,000–35,000 rpm, the centrifugal slinging action of vane 27 will cause migration of the magnetic ferrofluid 18 from between the opposing ends of the fin-like projections 16 and 17, particularly if at the transition speed of 10,000 rpm the electromagnet used to produce the concentrated magnetic field between the opposing ends of 16 and 17, is discontinued. As a result of this centrifugal slinging action, the fluid will pool in the space 26 thereby forming an hermetic centrifugal seal in the well-known manner of centrifugal seals as described more fully in the above-referenced U.S. Pat. No. 4,304,411.

FIGS. 7 and 8 of the drawings illustrate an alternative form of a combination magnetic/centrifugal-fluid seal constructed according to the invention which operates in a similar manner to the combined magnetic/centrifugal seal shown and described with relation to FIGS. 5 and 6 but is constructed differently. In the embodiment of the invention shown in FIGS. 7 and 8, the fin-like projections 16 and 17 defining the magnetic sealing regions are constructed so as be arranged concentrically around the sides of an enlarged diameter vane 27 secured to and rotating with the shaft 11. The fin-like projections 16 extending from the housing section 15 oppose the fin-like projections 17 formed on the annular sides of the vane 27 by being concentrically arrayed around opposing side portions 15 of the magnetically permeable housing section to define the gaps in which the ferrofluid 18 is trapped while operating in the magnetic sealing mode. Thereafter, as the rotational speed of shaft 11 is increased above a critical speed, for example 10,000 rpm, the ferrofluid 18 migrates up into the centrifugal sealing region 26 in a similar fashion to that described with relation to FIGS. 5 and 6.

From the foregoing description, it will be appreciated that the invention provides a new and improved ferro fin magnetic seal design wherein the magnetic seal geometry is optimized to provide maximum hermetic sealing capacity for a given size magnetic seal structure.

Having described several embodiments of a new and improved ferro fin magnetic seal used alone and in conjunction with a magnetic/centrifugal-fluid seal constructed according to the invention, it is believed that other modifications, variations and changes will be suggested to those skilled in the art in the light of the above teachings. It is therefore to be understood that all such variations, modifications and changes which are within the capabilities of one having ordinary skill in the art are believed to come within the scope of the invention as defined by the appended claims.

What is claimed is:

1. A ferrofin magnetic fluid seal comprising a shaft having a magnetically permeable portion supporting a plurality of concentric fin-like projections of magnetically permeable material circumferentially arrayed in parallel along a portion of the axial length of the shaft, a housing surrounding and rotatably supporting said shaft, said housing having a seal forming section having a plurality of parallel, axially arrayed fin-like projections made from magnetically permeable material circumferentially surrounding the interior of the housing and opposing said axially arrayed, parallel concentric fin-like projections on said shaft portion, a magnetic fluid disposed within the gaps defined between the ends of the opposing fin-like projections extending from said shaft portion and from said surrounding housing seal forming section, said housing seal forming section being fabricated from magnetically permeable material and being physically disposed in a closed series magnetic circuit with a source of magnetic flux, said closed series magnetic circuit further including the axially arrayed, concentric fin-like projections extending from said housing, the magnetically permeable shaft portion and the axially arrayed, concentric fin-like projections extending therefrom and the magnetic fluid droplets disposed in the gaps between the opposing ends of the sets of opposing fin-like projections, the fin-like projections on the magnetically permeable shaft portion and on the seal forming section each have a tooth width $t$ and a tooth spacing $s$ which are optimized so as to yield a maximum number of magnetic seal stages $N$ over a given axial length $L$ of the shaft in accordance with the expression $N_{max} = L/(t+s)$, and the ends of the opposing fin-like projections being spaced apart a distance $h$ that defines the gaps in which the magnetic fluid is trapped to form the magnetic seal and wherein optimum sealing capacity is obtained where $t$ ranges in value from substantially $h$ to $5h$ and $s$ ranges in value from substantially $2h$ to $3h$.

2. A ferrofin magnetic fluid seal according to claim 1 wherein the optimum values of $t$ and $s$ are given by the ratios $t/h$ and $s/h$ and wherein the ratios have the following relations:

| $\frac{t}{h}$ | $\frac{s}{h}$ |
|---|---|
| 1.00 | 1.957 |
| 1.50 | 2.175 |
| 2.00 | 2.363 |
| 2.50 | 2.529 |
| 3.00 | 2.679 |
| 3.50 | 2.818 |
| 4.00 | 2.948 |
| 4.50 | 3.070 |
| 5.00 | 3.185 |

3. A ferrofin magnetic fluid seal according to claim 1 wherein the ends of the opposing fin-like projections are spaced apart a distance $h$ that defines the gaps in which the magnetic fluid is trapped to form the magnetic seal and wherein maximum sealing capacity is obtained by a design where $t$ is substantially equal to $2h$ and $s$ is substantially equal to $3h$.

4. A ferrofin magnetic fluid seal according to either claim 2 or 3 wherein the number of magnetic seal stages is at least four.

5. A ferrofin magnetic fluid seal according to claim 1 or 2 wherein the source of magnetic flux is an electromagnet.

6. A ferrofin magnetic fluis seal according to claim 1 or 2 wherein the source of magnetic flux is a permanent magnet.

7. A combination magnetic/centrifugal-fluid seal having a magnetic sealing region according to claim 1 and further including a circumferentially arranged centrifugal seal region radially disposed outwardly from said magnetic seal region and communicating therewith and physically located between said housing seal forming section and said shaft portion for receiving and pooling fluid centrifugally thrown there during high speed rotation of said shaft to thereby form a centrifugal hermetic seal between the housing and the shaft.

8. A combination magnetic/centrifugal-fluid seal having a magnetic sealing region according to claim 2 and further including a circumferentially arranged centrifugal seal region radially disposed outwardly from said magnetic seal region and communicating therewith and physically located between said housing seal forming section and said shaft portion for receiving and pooling fluid centrifugally thrown there during high speed rotation of said shaft to thereby form a centrifugal hermetic seal between the housing and the shaft.

9. A combination magnetic/centrifugal-fluid seal according to claim 8 wherein the source of magnetic flux is an electromagnet.

10. A combination magnetic/centrifugal-fluid seal according to claim 8 wherein the source of magnetic flux is a permanent magnet.

11. A ferrofin magnetic fluid seal for hermetically sealing the space between a portion of a rotating member of magnetically permeable material and a portion of a close fitting spaced-apart stationary member of magnetically permeable material and comprising a plurality of concentric fin-like projections of magnetically permeable material formed on each of said rotating members and on said stationary member portions in spaced-apart opposing relation to define a plurality of magnetic gap regions, a magnetic fluid disposed within the magnetic gap regions, and magnetic field producing means magnetically coupled in closed magnetic circuit relationship with at least said portions of said rotating and stationary membes and further including the opposed fin-like projections and magnetic fluid trapped in the magnetic gaps defined by the opposing ends of the fin-like projections, the fin-like projections each have a tooth width t and a tooth spacing s which are optimized so as to yield a maximum number of magnetic seal stages N over a given axial length L of the magnetic seal region in accordance with the expression $N_{max} = L/(t+s)$, and the ends of the opposing fin-like projections being spaced apart a distance h that defines the gaps in which the magnetic fluid is trapped to from the magnetic seal and wherein optimum sealing capacity is obtained where t ranges in value from substantially h to 5h and s ranges in value from substantially 2h to 3h.

12. A ferrofin magnetic fluid seal according to claim 11 wherein the optimum values of t and s are given by the ratios t/h and s/h and wherein the ratios have the following relations:

| $\frac{t}{h}$ | $\frac{s}{h}$ |
|---|---|
| 1.00 | 1.957 |
| 1.50 | 2.175 |
| 2.00 | 2.363 |
| 2.50 | 2.529 |
| 3.00 | 2.679 |
| 3.50 | 2.818 |
| 4.00 | 2.948 |
| 4.50 | 3.070 |
| 5.00 | 3.185 |

13. A ferrofin magnetic fluid seal according to claim 11 wherein the ends of the opposing fin-like projections are spaced apart a distance h that defines the gaps in which the magnetic fluid is trapped to form the magnetic seal and wherein maximum sealing capacity is obtained by a design where t is substantially equal to 2h and s is substantially equal to 3h.

14. A ferrofin magnetic fluid seal according to claim 11 wherein the source of magnetic flux is an electromagnet.

15. A ferrofin magnetic fluid seal according to claim 11 wherein the source of magnetic flux is a permanent magnet.

16. A combination magnetic/centrifugal-fluid seal having a magnetic sealing region according to claim 11 and further including a circumferentially arranged centrifugal seal region radially disposed outwardly from said magnetic seal region and communicating therewith and physically located between said rotating and stationary members for receiving and pooling fluid centrifugally thrown there during high speed rotation of said rotating member to thereby form a centrifugal hermetic seal between the stationary member and the rotating member during high speed rotation of the rotating member.

17. A combination magnetic/centrifugal-fluid seal having a magnetic sealing region according to claim 11 and further including a circumferentially arranged centrifugal seal region radially disposed outwardly from said magnetic seal region and communicating therewith and physically located between said rotating and stationary members for receiving and pooling fluid centrifugally thrown there during high speed rotation of said rotating member to thereby form a centrifugal hermetic seal between the stationary member and the rotating member during high speed rotation of the rotating member.

18. A combination magnetic/centrifugal-fluid seal according to claim 17 wherein the source of magnetic flux is an electromagnet.

19. A combination magnetic/centrifugal-fluid seal according to claim 17 wherein the source of magnetic flux is a permanent magnet.

* * * * *